(12) United States Patent
Finley et al.

(10) Patent No.: US 11,949,523 B2
(45) Date of Patent: Apr. 2, 2024

(54) DATA STORAGE METERING AND BILLING

(71) Applicant: Lenovo Global Technology (United States) Inc., Morrisville, NC (US)

(72) Inventors: Brian E. Finley, Allen, TX (US); Robert Furda, Bratislava (SK); Eric R. Kern, Chapel Hill, NC (US); Asmaa El Andaloussi, Asnieres-sur-Seine (FR); Paola Martinez Morales, Wendell, NC (US)

(73) Assignee: Lenovo Global Technology (United States) Inc., Morrisville, NC (US)

( * ) Notice: Subject to any disclaimer, the term of this patent is extended or adjusted under 35 U.S.C. 154(b) by 259 days.

(21) Appl. No.: 17/592,355

(22) Filed: Feb. 3, 2022

(65) Prior Publication Data

US 2023/0246856 A1    Aug. 3, 2023

(51) Int. Cl.
*H04L 12/14* (2006.01)
*G06Q 30/0283* (2023.01)
*G06Q 30/04* (2012.01)
*H04L 67/1097* (2022.01)

(52) U.S. Cl.
CPC ...... *H04L 12/1403* (2013.01); *H04L 12/1414* (2013.01); *H04L 12/146* (2013.01); *H04L 67/1097* (2013.01); *G06Q 30/0283* (2013.01); *G06Q 30/04* (2013.01)

(58) Field of Classification Search
CPC ............. H04L 12/1403; H04L 12/1414; H04L 12/146; H04L 67/1097; G06Q 30/0283; G06Q 30/04
See application file for complete search history.

(56) References Cited

U.S. PATENT DOCUMENTS 9,971,544 B1 *   5/2018   Johnson .................. G06F 3/061

* cited by examiner

*Primary Examiner* — Paul Danneman
(74) *Attorney, Agent, or Firm* — Kunzler Bean & Adamson; Bruce R. Needham

(57) ABSTRACT

A method for data storage metering and billing includes receiving, at an owner server on a periodic basis, storage utilization data. The storage utilization data includes one or more measurements of data storage usage for data storage at a customer location of a customer where the customer location is remote from the owner server. The method includes calculating, from the storage utilization data, average storage utilization data that includes an average of the storage utilization data from the customer location for a billing period. The method includes calculating billing information for the average storage utilization data for the billing period where the billing information is calculated from the average storage utilization data and a calculated storage billing rate, and providing, to the customer, access to the billing information.

20 Claims, 5 Drawing Sheets

DATA STORAGE METERING AND BILLING

FIELD

The subject matter disclosed herein relates to billing for data storage and more particularly relates to data storage metering and billing.

BACKGROUND

Often an entity with a data center, for example for cloud computing services, leases data storage devices. Billing for the leased data storage devices typically is based on the capacity of the lease data storage.

BRIEF SUMMARY

A method for data storage metering and billing is disclosed. An apparatus and computer program product also perform the functions of the method. The method includes receiving, at an owner server on a periodic basis, storage utilization data. The storage utilization data includes one or more measurements of data storage usage for data storage at a customer location of a customer where the customer location is remote from the owner server. The method includes calculating, from the storage utilization data, average storage utilization data that includes an average of the storage utilization data from the customer location for a billing period. The method includes calculating billing information for the average storage utilization data for the billing period where the billing information is calculated from the average storage utilization data and a calculated storage billing rate, and providing, to the customer, access to the billing information.

An apparatus for data storage metering and billing includes a processor and non-transitory computer readable storage media storing code. The code is executable by the processor to perform operations that include receiving, at an owner server on a periodic basis, storage utilization data. The storage utilization data includes one or more measurements of data storage usage for data storage at a customer location of a customer where the customer location is remote from the owner server. The operations include calculating, from the storage utilization data, average storage utilization data that includes an average of the storage utilization data from the customer location for a billing period. The operations include calculating billing information for the average storage utilization data for the billing period where the billing information is calculated from the average storage utilization data and a calculated storage billing rate, and providing, to the customer, access to the billing information.

A program product for data storage metering and billing includes a non-transitory computer readable storage medium storing code. The code is configured to be executable by a processor to perform operations that include receiving, at an owner server on a periodic basis, storage utilization data. The storage utilization data includes one or more measurements of data storage usage for data storage at a customer location of a customer where the customer location is remote from the owner server. The operations include calculating, from the storage utilization data, average storage utilization data that includes an average of the storage utilization data from the customer location for a billing period. The operations include calculating billing information for the average storage utilization data for the billing period where the billing information is calculated from the average storage utilization data and a calculated storage billing rate, and providing, to the customer, access to the billing information.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
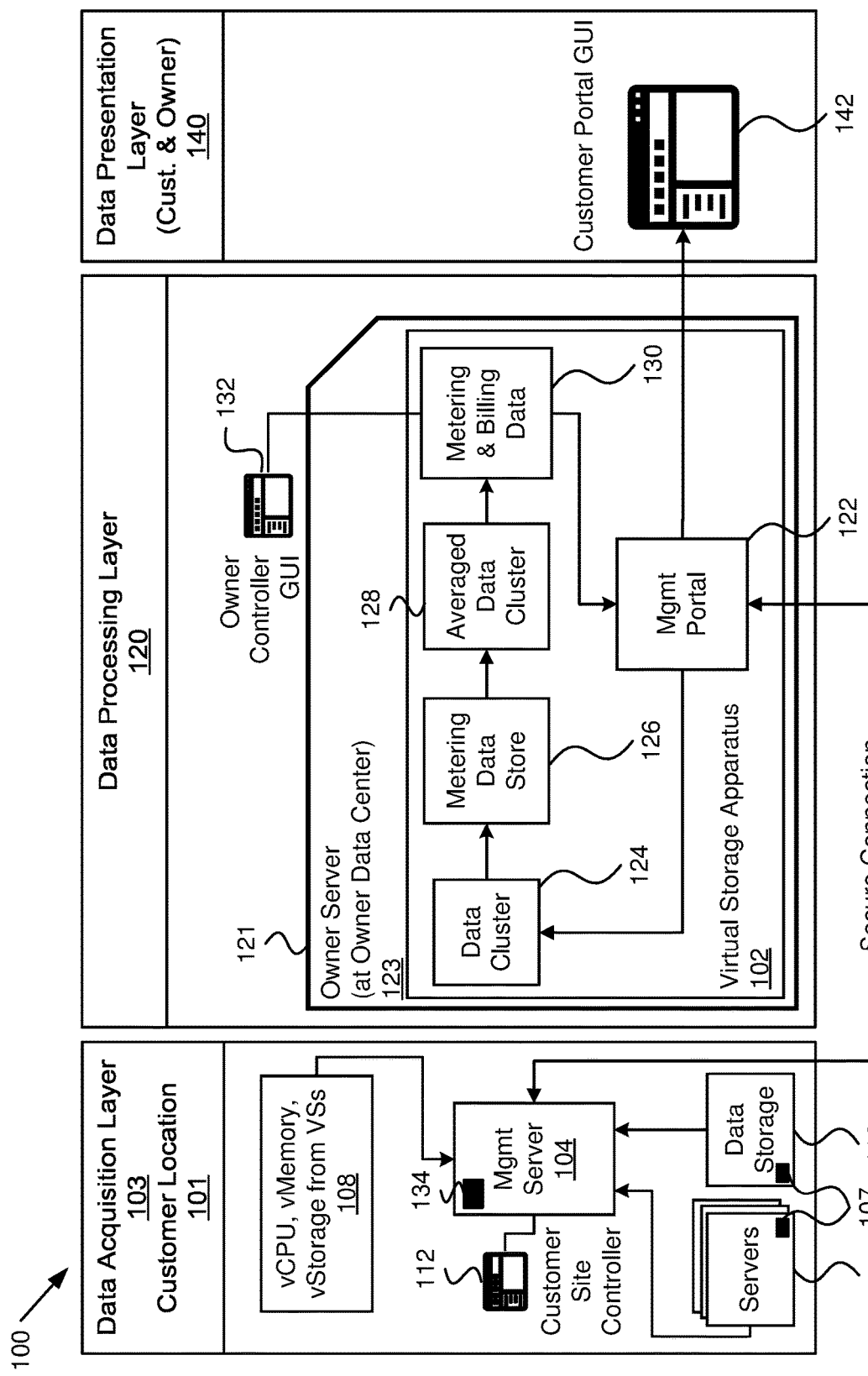
FIG. 1 is a schematic block diagram illustrating a system for data storage metering and billing, according to various embodiments.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices, in some embodiments, are tangible, non-transitory, and/or non-transmission.

Many of the functional units described in this specification have been labeled as modules, in order to more particularly emphasize their implementation independence. For example, a module may be implemented as a hardware circuit comprising custom very large scale integrated ("VLSI") circuits or gate arrays, off-the-shelf semiconductors such as logic chips, transistors, or other discrete components. A module may also be implemented in programmable hardware devices such as a field programmable gate array ("FPGA"), programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, R, Java, Java Script, Smalltalk, C++, C sharp, Lisp, Clojure, PHP, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise.

The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

A method for data storage metering and billing is disclosed. An apparatus and computer program product also perform the functions of the method. The method includes receiving, at an owner server on a periodic basis, storage utilization data. The storage utilization data includes one or more measurements of data storage usage for data storage at a customer location of a customer where the customer location is remote from the owner server. The method includes calculating, from the storage utilization data, average storage utilization data that includes an average of the storage utilization data from the customer location for a billing period. The method includes calculating billing information for the average storage utilization data for the billing period where the billing information is calculated from the average storage utilization data and a calculated storage billing rate, and providing, to the customer, access to the billing information.

In some embodiments, the storage utilization data includes a plurality of measurements of storage utilization data and calculating the average storage utilization data for the billing period includes averaging the plurality of measurements of storage utilization data. In other embodiments, calculating the billing information for the average storage utilization data for the billing period includes calculating the calculated storage billing rate from a class rate for a type of storage used at the customer location, a period modifier based on an amount of time of a subscription for the data storage, a consumption level discount that includes a discount level based on an amount of average storage utilization during the billing period, and/or a customer discount for the subscription for the data storage that includes a pre-negotiated discount for the customer, and by multiplying the calculated storage billing rate by the average storage utilization data over the billing period. In further embodiments, calculating the calculated storage billing rate uses $$R = CPLD$$

where:
R is the calculated storage billing rate;
C is the class rate;
P is the period modifier;
L is the consumption level discount; and
D is the customer discount.

In some embodiments, calculating the billing information for the average storage utilization data for the billing period includes comparing the average storage utilization data for the billing period with a minimum storage threshold, calculating the billing information by multiplying the average storage utilization data by the calculated storage billing rate in response to the average storage utilization data for the billing period exceeding the minimum storage threshold, and calculating the billing information by adding a minimum storage charge to the billing information for the billing period in response to the average storage utilization data for the billing period not exceeding the minimum storage threshold. In other embodiments, the storage utilization data includes virtual data storage usage of one or more virtual structures running on one or more servers at the customer location where the one or more virtual structures include virtual machines ("VMs") and/or containers.

In some embodiments, receiving the storage utilization data is over a management network separate from a data network used by one or more servers at the customer location. In other embodiments, receiving the storage utilization data over the management network is via a virtual private network ("VPN"). In other embodiments, receiving the storage utilization data includes receiving the storage utilization data over a secure communication protocol using full-duplex communication over a single web connection. In other embodiments, receiving the storage utilization data is from a management server at the customer location and the management server receives storage utilization data from one or more virtual structures on a plurality of servers at the customer location and stores the storage utilization data prior to transmission to the owner server. The one or more virtual structures include VMs and/or containers.

An apparatus for data storage metering and billing includes a processor and non-transitory computer readable storage media storing code. The code is executable by the processor to perform operations that include receiving, at an owner server on a periodic basis, storage utilization data. The storage utilization data includes one or more measurements of data storage usage for data storage at a customer location of a customer where the customer location is remote from the owner server. The operations include calculating, from the storage utilization data, average storage utilization data that include an average of the storage utilization data from the customer location for a billing period. The operations include calculating billing information for the average storage utilization data for the billing period where the billing information is calculated from the average storage utilization data and a calculated storage billing rate, and providing, to the customer, access to the billing information.

In some embodiments, the storage utilization data includes a plurality of measurements of storage utilization data and calculating the average storage utilization data for the billing period includes averaging the plurality of measurements of storage utilization data. In other embodiments, calculating the billing information for the average storage utilization data for the billing period includes calculating the calculated storage billing rate from a class rate for a type of storage used at the customer location, a period modifier based on an amount of time of a subscription for the data storage, a consumption level discount that includes a discount level based on an amount of average storage utilization during the billing period, and/or a customer discount for the subscription for the data storage that includes a pre-negotiated discount for the customer, and by multiplying the calculated storage billing rate by the average storage utilization data over the billing period. In further embodiments, calculating the calculated storage billing rate uses:

$$R=CPLD$$

where:
R is the calculated storage billing rate;
C is the class rate;
P is the period modifier;
L is the consumption level discount; and
D is the customer discount.

In some embodiments, calculating the billing information for the average storage utilization data for the billing period includes comparing the average storage utilization data for the billing period with a minimum storage threshold, calculating the billing information by multiplying the average storage utilization data by the calculated storage billing rate in response to the average storage utilization data for the billing period exceeding the minimum storage threshold, and calculating the billing information by adding a minimum storage charge to the billing information for the billing period in response to the average storage utilization data for the billing period not exceeding the minimum storage threshold. In other embodiments, the storage utilization data includes virtual data storage usage of one or more virtual structures running on one or more servers at the customer location. The one or more virtual structures include VMs and/or containers.

In some embodiments, receiving the storage utilization data is over a management network separate from a data network used by one or more servers at the customer location. In other embodiments, receiving the storage utilization data over the management network is via a VPN. In other embodiments, receiving the storage utilization data is from a customer server at the customer location and the customer server receives storage utilization data from one or more virtual structures on a plurality of servers at the customer location and stores the storage utilization data prior to transmission to the owner server. The one or more virtual structures include VMs and/or containers.

A program product for data storage metering and billing includes a non-transitory computer readable storage medium storing code. The code is configured to be executable by a processor to perform operations that include receiving, at an owner server on a periodic basis, storage utilization data. The storage utilization data includes one or more measurements of data storage usage for data storage at a customer location of a customer where the customer location is remote from the owner server. The operations include calculating, from the storage utilization data, average storage utilization data that includes an average of the storage utilization data from the customer location for a billing period. The operations include calculating billing information for the average storage utilization data for the billing period where the billing information is calculated from the average storage utilization data and a calculated storage billing rate, and providing, to the customer, access to the billing information.

FIG. 1 is a schematic block diagram illustrating a system 100 for data storage metering and billing, according to various embodiments. The system 100 includes a data acquisition layer 103 at a customer location 101 (on-premises site) with a storage metering apparatus 134 in a management server 104, servers 106 each with a management controller, a virtualization layer 108 with virtual allocation data from virtual central processing units ("CPUs"), virtual memory, and virtual data storage from one or more virtual structures ("virtual structures") running on the servers 106, data storage 110 and a customer site controller GUI 112. The system 100 includes a data processing layer 120 at an owner location 121 (off-premises site), which includes an owner server 123, with a management portal 122, a data cluster 124, a metering data store 126, an averaged data cluster 128, metering and billing data processing module 130, and an storage billing apparatus 102. Off-premises is also an owner controller graphical user interface ("GUI") 132. The system 100 includes a data presentation layer 140 accessible to the customer and owner that includes a customer portal GUI 142. Components of the system 100 are described below.

Often a vendor (e.g. owner) will lease computing resources to a customer where the computing resources are located at a customer location 101 (on-site premises) located remotely from an owner location 121 (off-site premises), which may be an owner data center with an owner server 123. The computing resources include servers 106, data storage 110, memory, and the like. The customer location 101 may be a data center for cloud computing where clients of the customer run workloads on one or more virtual machines ("VMs") containers running on the servers 106. As used herein a virtual machine is a virtual structure ("VS"). Likewise, a container is a virtual structure. Other similar structures running virtually on a server 106 may also be a virtual structure. In some embodiments, the servers 106, data storage 110, and other equipment include a hypervisor that controls the virtual structures. Typically, the servers 106 each include a management controller 107, which may be called a baseboard management controller ("BMC"). One example of a management controller 107 is a Lenovo® XClarity® Controller ("XCC").

Typically, the management controller 107 is connected to a management network separate from a data network used by the VMs, containers, and servers 106 for communications, workloads, etc. The management controllers 107 typically have access to various components of the servers 106 and are able to control the components, report alerts and other data from the components and manage the components. In some embodiments, a management controller 107 is able to access components of the server 106 when the server is not running and is often able to reboot the server 106.

The management controllers 107, in some embodiments, include a power metering function to meter power consumed by the servers 106. Often, the management controller 107 also is able to monitor power usage of various components, such as CPUs, memory, data storage, power supplies, etc. of the server 106. In some embodiments, other devices include a management controller 107, such as a data storage device 110.

In some embodiments, the management controllers 107 of the servers 106, data storage 110, etc. are connected to a management server 104 that acts as a gateway for external communications. The management server 104, in some embodiments, is a Lenovo XClarity Administrator ("LXCA"). In other embodiments, the management server 104 is a Lenovo XClarity Orchestrator ("LXCO"). In other embodiments, the management server 104 is from another vendor. In some embodiments, the management server 104 is accessible over a private and/or secure connection. In some embodiments, a system administrator is able to access the management server 104 via virtual private network ("VPN") over a public computer network, such as the Internet. In other embodiments, the secure connection between the management server 104 and other devices, such as the owner server 123, is implemented using another secure communications protocol. In embodiments described herein, the owner server 123 is able to communicate with the management server 104 and is able to receive metering data, which is explained further below.

A virtual machine is a virtual structure that typically runs a separate instance of an operating system. VMs are used by clients to run workloads and are designed with certain security features. Typically, VMs are separated from each other so that data from a VM does not see data from another VM. VMs typically run a complete operating system, including a separate kernel. A container is a lightweight virtual structure that has some separation from VMs and other containers but may not have separate instance of an operating system. A container, in some embodiments, is an isolated, lightweight silo for running an application on a host operating system. Containers often build on top of the host operating system's kernel and typically contain only applications and some lightweight operating system application programming interfaces ("APIs") and servers that run in user mode. Both VMs and containers can be set up with allocated virtual resources.

A virtual structure, in some embodiments, is allocated a certain number of virtual CPUs. A server typically includes multiple CPUs or cores controlled by the hypervisor or other management device. A virtual CPU ("vCPU") is allocated to a VM or container but the actual CPU executing code for the virtual CPU may be assigned by the hypervisor. From the perspective of the VM or container, the virtual CPU is a dedicated CPU, but may in actuality be running on any of a number of physical CPUs. Typically, a physical CPU is able to support a certain number of vCPUs. In some examples, a physical CPU supports up to five vCPUs. Other physical CPUs support other numbers of vCPUs.

A virtual structure, in some embodiments, has a maximum number of vCPUs that can be allocated to the virtual structure. In some examples, a VM may have a maximum of eight vCPUs. At any particular time, the virtual structure may be allocated some number of vCPUs, which may change over time. For example, a VM may be required to run quarterly reports, which take a lot of computing resources, but may have a lighter workload during periods when not running the quarterly reports. In such instances, the VM may be allocated two vCPUs during non-peak times and eight vCPUs during peak times. Embodiments described herein enable billing based on the number of currently allocated vCPUs rather than the maximum allowed vCPUs.

Often, physical CPUs are oversubscribed with virtual CPUs. For example, a server 106 may include eight physical CPUs, where each physical CPU may have eight vCPUs so there may be up to 40 vCPUs for a server 106. In reality, the vCPUs are not always running at full capacity, which lends itself to oversubscription of the physical CPUs. The management controllers 107 are able to monitor power usage and other metrics for the physical CPUs to have a right amount of oversubscription. Thus, where customers are billed based on allocated vCPUs, profit margin for the owner varies based on the amount of actual physical CPUs at the customer location 101.

Virtual memory ("vMemory") may also be allocated to a virtual structure. As with the physical CPUs, physical memory may be oversubscribed using virtual memory allocated to virtual structures. As used herein, memory is volatile memory typically accessible to CPUs over a high speed bus. Memory may be divided into various levels or cache and may be of various speeds and classes. Virtual data storage ("vStorage") may also be allocated to virtual structures. As used herein, data storage is non-volatile memory. Data storage may include solid-state memory, hard disk drives, optical drives and the like. As with physical CPUs, memory and data storage may be allocated to VMs and containers. Virtual memory may be allocated to a virtual structure. Virtual data storage may also be allocated to a virtual structure.

As with physical CPUs, physical memory and physical data storage may be oversubscribed. Virtual memory allocated to a virtual structure appears to the virtual structure as dedicated memory, but the hypervisor is able to map a portion of physical memory to the virtual memory of a virtual structure. Likewise, physical data storage may include various physical devices, data storage of different types, etc. Physical data storage may appear as a virtual block of storage but may map to several data storage devices in a redundant array of independent disks ("RAID"). Again, from the perspective of the virtual structure, the virtual data storage appears as dedicated data storage. Oversubscription of memory and data storage allows the owner to provide a client setting up a virtual structure with the resources the client desires but the physical resources have less capacity than the allocated virtual resources. Embodiments described herein enable billing based on actual allocated virtual memory and/or actual allocated virtual data storage, which may change as workloads of the client's virtual structure change.

The data acquisition layer 103 includes a virtualization layer 108 that provides access to virtualization information of each virtual structure, such as currently allocated vCPUs, maximum number of vCPUs, a maximum allowable amount of allocated virtual memory, currently allocated virtual memory, a maximum allowable amount of allocated virtual data storage, currently allocated virtual data storage, and the like. In some examples, the management server 104 has access to the virtualization layer 108 or to virtual structure ("VS") allocation data available from the virtualization layer 108.

The VS allocation data, in some embodiments, is created, updated, etc. when a virtual structure is created or updated. For example, a system administrator may access an interface to set up the VS allocation data for a virtual structure when creating the virtual structure. In some examples, the system administrator uses the customer site controller GUI 112, which may be running on the management server 104 or other server, to set up or update a virtual structure. In some embodiments, a hypervisor plays a role in creating and updating the virtual structure. One of skill in the art will recognize other ways to input VS allocation data in the virtualization layer 108.

The customer location 101 includes data storage 110 or access to data storage 110. In some embodiments, all or a portion of the data storage 110 is allocated to a virtual structure. The data storage 110 may include data storage within a server 106, data storage 110 in a computer rack, access to a storage area network ("SAN"), or other non-volatile data storage device. In some embodiments, a customer desires to be billed for actual data storage usage rather an allocated data storage, maximum available data storage or the like. The embodiments described herein provide metering and billing for data storage where a customer is able to be billed for average data storage utilization during a billing period, which may increase or decrease for each billing period. One of skill in the art will recognize other ways to implement data storage 110 that can be allocated to a virtual structure and billed based on average usage in a billing period.

The customer location 101 includes a storage metering apparatus 134 running on the management server 104. The storage metering apparatus 134, in some embodiments, gathers storage utilization data from the data storage 110 and/or virtualization layer 108, and periodically transmits the storage utilization data to the owner server 123, and may also receive access to billing information corresponding to the storage utilization data.

In some embodiments, the storage metering apparatus 134 receives storage utilization data from data storage 110 leased, rented, subscribed, etc. by the customer from the owner and located at the customer location 101. In some embodiments, the storage metering apparatus 134 receives the storage utilization data from a management controller 107 located in one or more data storage devices 110. In other embodiments, the storage metering apparatus 134 receives storage utilization data from the virtualization layer 108. For example, the virtualization layer 108 may include storage utilization data for each virtual machine.

As used herein, storage utilization data is data regarding usage of a data storage device 110 or actual usage of allocated virtual data storage. In some examples, the storage utilization data is a measure of how much of a data storage device currently has valid data stored thereon or is otherwise being used. For example, a data storage device 110 may have a capacity of 50 terabytes ("TB") and at a time of measurement 10 TB may include valid data instead of data storage that is free for storing additional data so the storage metering apparatus 134 reports 10 TB for the data storage device 110. In some embodiments, a virtual structure may be allocated 20 TB and may be using 5 TB so the storage metering apparatus 134 reports 5 TB for the virtual structure where the 5 TB is an actual amount of data storage usage of a physical data storage device. In some embodiments, the amount of data storage currently being used by virtual machines matches data storage currently being used by physical data storage 110 at the customer location 101 even though allocated virtual data storage may exceed the total capacity of the physical data storage 110.

The data processing layer 120 is used herein to describe actions associated with receiving storage utilization data for data storage billing along with other VS allocation data and power consumption data used for allocation billing, processing the data and creating billing information for the customer. The data processing layer 120 is off-premises and, in some embodiments, is at the owner location 121, which may be part of an owner data center. A storage billing apparatus 102 running on an owner server 123 at the owner location 121 receives, on a periodic basis, the storage utilization data and calculates, from the storage utilization data, average storage utilization data for a billing period. The storage billing apparatus 102 calculates billing information for a billing period from the average storage utilization data and a calculated storage billing rate and provides to the customer access to the billing information. Other functions of the data processing layer 120, in some embodiments, create billing information from VS allocation data and/or power consumption data and make the billing information available to the customer. The storage billing apparatus 102 is explained in more detail with regards to the apparatuses 200 and 300 of FIGS. 2 and 3.

The owner server 123 includes a management portal 122 that receives data from the management server 104. Typically, the management portal 122 receives data from the management server 104 over a secured connection, such as a VPN. The management portal 122, in some embodiments, interacts with hardware of the owner server 123, such as a network interface card ("NIC") for receiving or importing data from the management server 104. In some embodiments, the management portal 122 is running on a processor of the owner server 123. In some embodiments, the management portal is a Lenovo® XClarity® Orchestrator ("LXCO"). In other embodiments, the management portal 122 is from another vendor.

The owner server 123 includes a data cluster 124. In some embodiments, the data cluster 124 is a database or other data structure configured to store raw metering data, such as the storage utilization data, the VS allocation data and/or the power consumption data. For example, the raw metering data is received at the management portal 122 and stored in the data cluster 124 by a secure process that ensures that the raw metering data is intact and valid before any data is removed from the location where it was transmitted, such as from the management server 104. In some embodiments, the data cluster 124 is a Kafka data cluster. In some examples, the Kafka cluster may be controlled by an Apache Kafka application. In other embodiments, the Kafka cluster is created and controlled by another real-time data streaming software application.

The owner server 123 includes, in some embodiments, a metering data store 126 that includes metering data from the customer location 101. The metering data store 126, in some embodiments, is a data consumer and pulls data from the data cluster 124. In some embodiments, the metering data store 126 and the data cluster 124 are in a same data storage device or system and the metering data store 126 pulls or identifies metering data for a particular billing period.

The owner server 123 or other computing device at the owner location 121 includes an averaged data cluster 128 that includes metering data that is averaged over a particular time period, such as over a billing period. In some embodiments, the averaged data cluster 128 is a Kafka cluster. In some examples, storage utilization data, power consumption data, etc. is sampled at a small time increment, such as every second, every minute, every 10 minutes, etc. and is averaged over a particular time period, such as one hour, and is stored in the averaged data cluster 128. In other embodiments, storage utilization data in the metering data store 126 pertaining to a particular billing period is averaged and stored in the averaged data cluster 128.

The owner server 123 or other computing device at the owner location 121 includes a metering and billing data processing module 130 that uses averaged metering data from the averaged data cluster 128 for a particular billing period and calculates billing information from the averaged metering data. In some embodiments, the metering and billing data processing module 130 uses storage utilization data to calculate the billing information.

In some embodiments, the metering and billing data processing module 130 multiplies a calculated storage billing rate by the storage utilization data to determine a portion of the billing information. In some examples, the metering and billing data processing module 130 also processes VS allocation data and/or power metering data to creating additional billing information. In some examples, the metering and billing data processing module 130 creates additional billing information by multiplying the currently allocated number of vCPUs of a virtual structure by a vCPU billing rate, multiplying the currently allocated virtual memory by a virtual memory billing rate, etc. and adds the additional billing information to the billing information for the storage utilization data.

In some embodiments, the metering and billing data processing module 130 creates billing information for current averaged data storage utilization for virtual structures of the servers 106 along with billing information for VS allocation data for virtual structures of the servers 106 of the customer and adds the billing information from the various virtual structures. In other embodiments, the metering and billing data processing module 130 uses averaged power consumption data to determine additional billing information. In some examples, the metering and billing data processing module 130 uses averaged power consumption data of a virtual structure for billing if the averaged power consumption data is above a power threshold and adds the power consumption data charge to the billing information for the storage utilization data and/or VS allocation data.

Once the billing information is calculated, in some embodiments, the metering and billing data processing module 130 transmits billing information to the customer portal GUI 142 in a data presentation layer 140 available to the customer and to the owner. In other embodiments, the billing information goes through the management portal 122. In some embodiments, the averaged metering data is available at the customer portal GUI 142.

In various embodiments, metering data and billing information is transmitted over one or more computer networks (now shown). In some embodiments, the computer networks include a LAN, a WAN, a fiber network, a wireless connection, the Internet, and the like. In some embodiments, the computer networks include multiple networks, which may include private networks and/or public networks.

The wireless connection may be a mobile telephone network. The wireless connection may also employ a Wi-Fi network based on any one of the Institute of Electrical and Electronics Engineers (IEEE) 802.11 standards. Alternatively, the wireless connection may be a BLUETOOTH® connection. In addition, the wireless connection may employ a Radio Frequency Identification (RFID) communication including RFID standards established by the International Organization for Standardization (ISO), the International Electrotechnical Commission (IEC), the American Society for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® (IrDA®). Alternatively, the wireless connection may be a cellular telephone network communication. All standards and/or connection types include the latest version and revision of the standard and/or connection type as of the filing date of this application.

Figure 2:
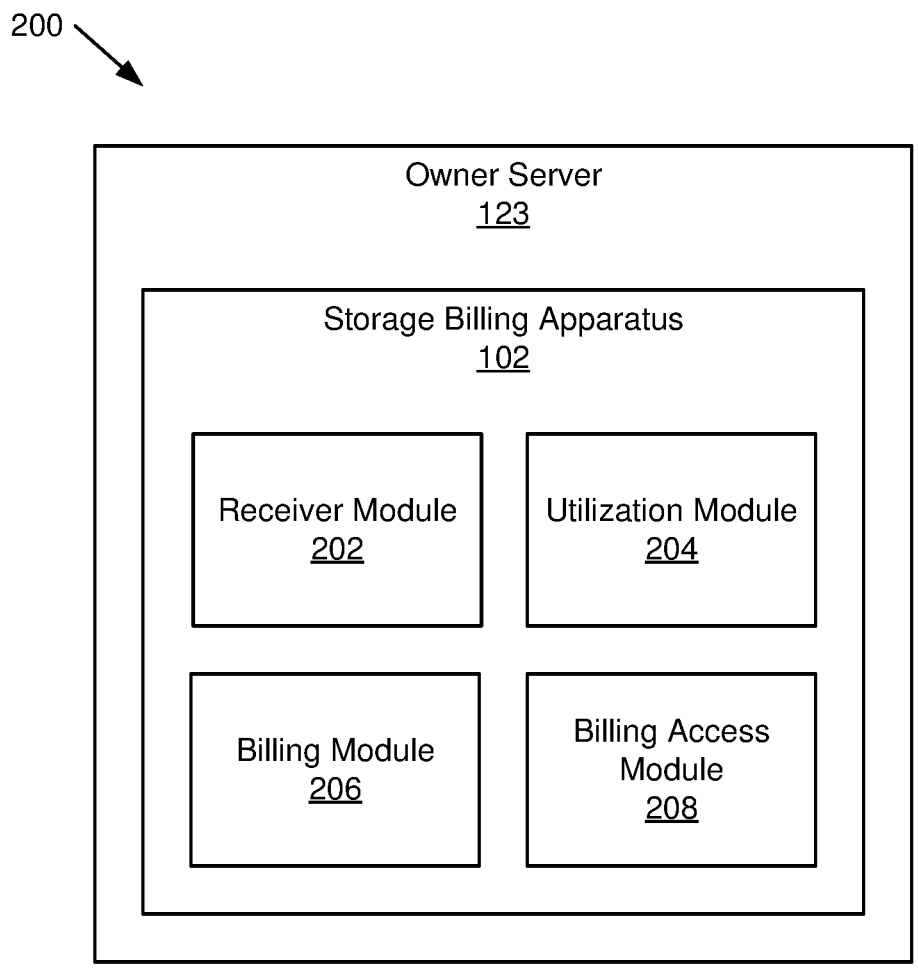
FIG. 2 is a schematic block diagram illustrating an apparatus for data storage metering and billing, according to various embodiments.

FIG. 2 is a schematic block diagram illustrating an apparatus 200 for data storage metering and billing, according to various embodiments. The apparatus 200 includes a storage billing apparatus 102 according to various embodiments, which may be located in an owner server 123. The storage billing apparatus 102 includes a receiver module 202, a utilization module 204, a billing module 206, and a billing access module 208, which are described below. In various embodiments, the apparatus 200 is implemented with code executable by a processor and stored on computer readable storage media. In some embodiments, all or a portion of the apparatus 200 is implemented using hardware circuits and/or a programmable hardware device.

The apparatus 200 includes a receiver module 202 configured to receive, at an owner server 123 on a periodic basis, storage utilization data. The storage utilization data includes one or more measurements of data storage usage for data storage 110 at a customer location 101 of a customer where the customer location 101 is remote from the owner server 123. In some embodiments, the storage utilization is actual data storage usage. In some embodiments, the receiver module 202 receives multiple transmissions of storage utilization data for a billing period. In other embodiments, the receiver module 202 receives one transmission of storage utilization data for a billing period. In other embodiments, the receiver module 202 receiving the storage utilization data includes the management server 104 transmitting the storage utilization data. In other embodiments, the receiver module 202 receiving the storage utilization data includes the receiver module 202 accessing and transferring the storage utilization data from the customer location 101.

In some embodiments, the receiver module 202 receives the storage utilization data is over a management network separate from a data network used by one or more servers 106 at the customer location 101. The management network may use Redfish, Intelligent Platform Management Interface ("IPMI"), or other management network protocol. In some embodiments, the receiver module 202 receives the storage utilization data via a VPN. In some embodiments, the receiver module 202 receives the storage utilization data over a secure communication protocol using full-duplex communication over a single web connection. In some examples, the secure communication protocol is a Web-Socket. One of skill in the art will recognize other ways for the receiver module 202 to receive storage utilization data from the customer location 101.

The apparatus 200 includes a utilization module 204 configured to calculate, from the storage utilization data, average storage utilization data. The average utilization data includes an average of the storage utilization data from the customer location 101 for a billing period. In some examples, the utilization module 204 gathers storage utilization data for a particular billing period where the storage utilization data for the billing period includes a number of measurements.

The apparatus 200 includes a billing module 206 configured to calculate billing information for the average storage utilization data for the billing period. The billing information is calculated from the average storage utilization data and a calculated storage billing rate. In some embodiments, the billing module 206 calculates the billing information by multiplying the average from the average storage utilization data by the calculated storage billing rate. In some embodiments, the calculated storage billing rate is calculated for the particular billing period based on storage utilization, classes of data storage 110, and other factors, which are described below. In some embodiments, the billing module 206 calculates the billing information based on a size of data storage usage before any storage efficiency algorithm is applied to the data. The storage efficiency algorithms may include compression, deduplication, compaction, and the like.

The apparatus 200 includes a billing access module 208 configured to provide, to the customer, access to the billing information. In some examples, the billing access module 208 adds the billing information to an application that includes the customer portal GUI 142 and the customer is able to log onto the customer portal GUI 142 to access the billing information. In other embodiments, the billing access module 208 sends billing information to the customer. In other embodiments, the billing access module 208 sends a notification to the customer that the billing information is available at the customer portal GUI 142. One of skill in the art will recognize other ways for the billing access module 208 to provide, to the customer, access to the billing information for a billing period.

Figure 3:
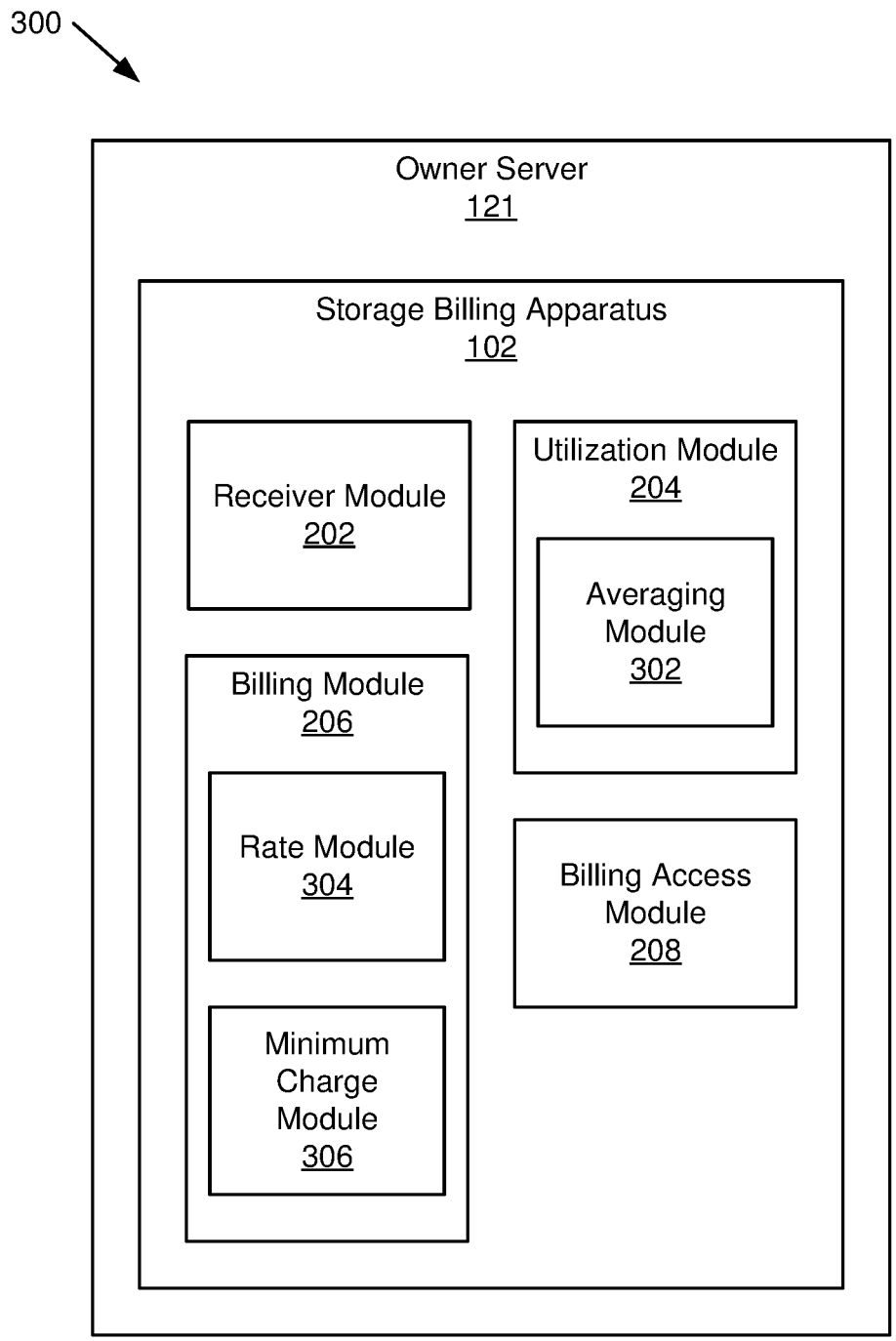
FIG. 3 is a schematic block diagram illustrating another apparatus for data storage metering and billing, according to various embodiments.

FIG. 3 is a schematic block diagram illustrating another apparatus 300 for data storage metering and billing, according to various embodiments. The apparatus 300 includes another storage billing apparatus 102 according to various embodiments, which may be located in an owner server 123. The storage billing apparatus 102 includes a receiver module 202, a utilization module 204, a billing module 206, and a billing access module 208, which are substantially similar to those described above in relation to the apparatus 200 of FIG. 2. The storage billing apparatus 102, in various embodiments, includes an averaging module 302 in the utilization module 204 and/or a rate module 304 and/or a minimum charge module 306 in the billing module 206, which are described below. In various embodiments, the apparatus 300 is implemented with code executable by a processor and stored on computer readable storage media. In some embodiments, all or a portion of the apparatus 300 is implemented using hardware circuits and/or a programmable hardware device.

In some embodiments, the storage utilization data includes a plurality of measurements of storage utilization data and the apparatus 300 includes an averaging module 302 in the utilization module 204 configured to calculate the average storage utilization data for the billing period by averaging the plurality of measurements of storage utilization data. In some embodiments, the averaging module 302 determines a number of measurements of the storage utilization data, sums storage utilization for each of the measurements and divides the sum by the number of measurements. In other embodiments, the averaging module 302 determines average storage utilization data for each virtual structure and then sums the average storage utilization data of the virtual structures. One of skill in the art will recognize other ways for the averaging module 302 to create the average storage utilization data.

The apparatus 300, in some embodiments, includes a rate module 304 in the billing module 206 configured to calculate the calculated storage billing rate for a billing period. In some embodiments, the rate module 304 calculates the calculated storage billing rate by determining classes of data storage devices 110 that are part of the data storage 110 at the customer location 101. For example, the data storage devices 110 may be of different speeds or classes. In various embodiments, the data storage devices 110 may include relatively slow hard disk drives or optical drives and may include faster solid state storage, such as flash memory. The solid state storage may include various classes of flash memory that run at different speeds.

In some embodiments, each class of data storage has a different storage billing rate. In various embodiments, the customer may lease a single class of data storage 110 or may lease different classes of data storage. Where the data storage 110 is of different classes, in some embodiments, the rate module 304 uses a storage billing rate for the fastest data storage devices 110 leased by the customer. In other embodiments, the rate module 304 uses an average storage billing rate of the data storage billing rates of the classes of data storage devices 110 leased by the customer. The average storage billing rate may be a weighted average. In other embodiments, the storage utilization data is divided by the different classes of data storage devices 110 leased by the customer and the averaging module 302 averages storage utilization data by data storage device class and the rate module 304 uses a different storage billing rate for each data storage device class. The billing module 206, for each data storage device class leased by the customer, multiplies the average storage utilization data for a data storage device class for the billing period by a storage billing rate for the data storage device class. One of skill in the art will recognize other ways for the rate module 304 and the billing module 206 to determine billing information when the data storage 110 has data storage devices 110 of different classes.

In some embodiments, the rate module 304 calculates the storage billing rate for a billing period by using a period modifier. The period modifier, in some embodiments, takes into account a period that the customer subscribes to the data storage 110. For example, a customer may subscribe for a relatively short period, such as six months, while another customer may subscribe for a longer period, such as 36 months and the subscription to the data storage 110 for a longer period may get a discount compared to a storage billing rate for a shorter subscription. The rate module 304 may then use a period multiplier of one for a shortest subscription period and a fraction for longer subscription periods. For example, for a subscription for six months or shorter, the rate module 304 may use a period multiplier of one and for the subscription of 46 months the period multiplier may be 0.8. The owner may set different period multipliers for different subscription periods. The billing module 206 may then use the storage billing rates for one or more storage device classes multiplied by an appropriate period modifier to determine a calculated storage billing rate.

In some embodiments, the rate module 304 uses a consumption level discount to calculate the storage billing rate for a billing period. In some embodiments, once data storage utilization reaches a particular level, the customer may receive a discount. In some embodiments, the rate module 304 uses one or more consumption levels. In some examples, the customer may lease 2 TB of storage and the consumption levels may be 400 MB, 800 MB, and 1200 MB where the consumption level discount is 1 for up to 400 MB, 0.95 for 400 MB to 800 MB, 0.9 for 800 MB to 1200 MB and 0.85 for 1200 MB and above. The rate module 304 may then multiply the storage billing rate for a billing period by the consumption level discount for the applicable data storage utilization for the billing period. In other embodiments where the storage utilization data is divided into groups, such as for different data storage device classes, the consumption level discounts may be per data storage device class. One of skill in the art will recognize other ways for the rate module 304 to utilize consumption level classes in calculating a storage billing rate for a billing period.

In some embodiments, the rate module 304 uses a customer discount to calculate the storage billing rate for a billing period. In some embodiments, the customer discount for a subscription for the data storage 110 includes a pre-negotiated discount for the customer. For example, the customer may receive a discount based on factors such as a number of leased devices, an intended use for the customer leased devices, and the like. In some embodiments, the customer discount is based on the manufacturer of the data storage 110. In other embodiments, the data storage 110 is leased through a business partner of the customer, which results in a customer discount. The rate module 304 may then multiply the storage billing rate by the customer discount to calculate the storage billing rate for a billing period.

In some embodiments, the rate module 304 calculates the storage billing rate using:

$$R=CPLD$$

where:
R is the calculated storage billing rate;
C is the class rate;
P is the period modifier;
L is the consumption level discount; and
D is the customer discount.

One of skill in the art will recognize other ways for the rate module 304 to use various factors, such as a class rate, a period modifier, a consumption level discount, a customer discount, etc. to calculate a storage billing rate for a billing period.

The apparatus 300, in some embodiments, includes a minimum charge module 306 in the billing module 206 configured to calculate the billing information based on a minimum charge where data storage utilization for a billing period below a minimum storage threshold results in use of the minimum charge. In some embodiments, the minimum charge module 306 compares the average storage utilization data for the billing period with a minimum storage threshold and calculates the billing information by multiplying the average storage utilization data by the calculated storage billing rate in response to the average storage utilization data for the billing period exceeding the minimum storage threshold.

The minimum charge module 306 adds a minimum storage charge to the billing information for the billing period in response to the average storage utilization data for the billing period not exceeding the minimum storage threshold. In some embodiments, the minimum charge module 306 uses the minimum charge as the amount to charge the customer when the average storage utilization data is below the minimum storage threshold. In other embodiments, the minimum charge module 306 also includes some charge for the average storage utilization data. In some embodiments, for example where the data storage 110 is divided into multiple classes of data storage, the minimum charge module 306 compares average storage utilization data for each class by a minimum storage threshold for the class and uses a different minimum storage charge for each data storage device class. One of skill in the art will recognize other ways for the minimum charge module 306 to use one or more minimum storage thresholds to charge one or more minimum storage charges for one or more classes of data storage 110.

Figure 4:
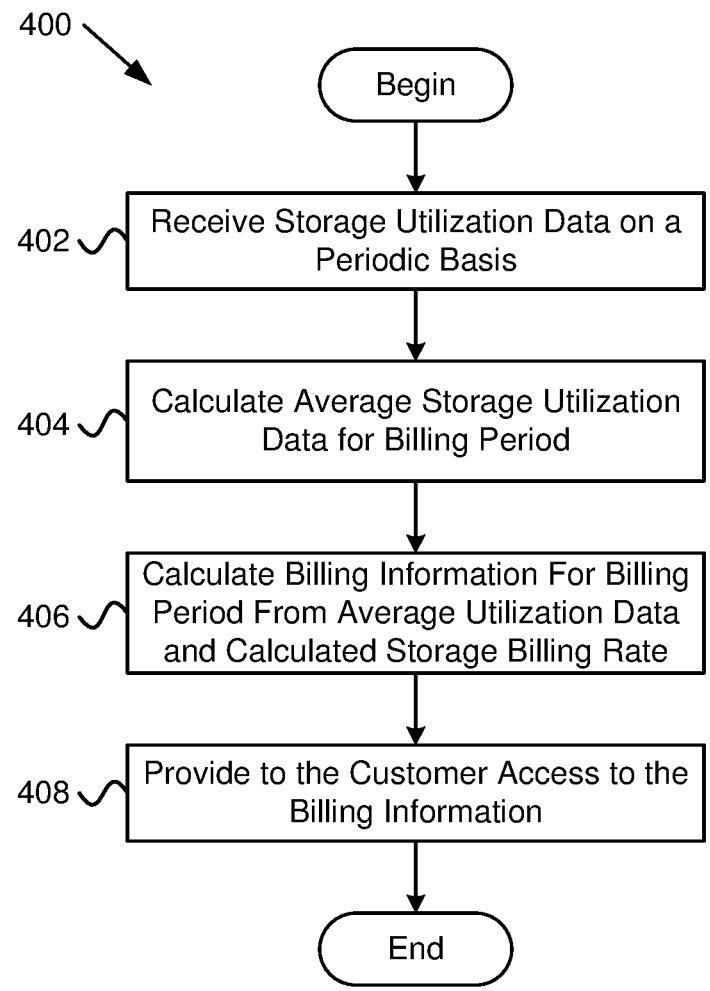
FIG. 4 is a schematic flow chart diagram illustrating a method for data storage metering and billing, according to various embodiments.

FIG. 4 is a schematic flow chart diagram illustrating a method 400 for data storage metering and billing, according to various embodiments. The method 400 begins and receives 402, at an owner server 123 on a periodic basis, storage utilization data. The storage utilization data includes one or more measurements of data storage usage for data storage 110 at a customer location 101 of a customer where the customer location 101 is remote from the owner server 123. The method 400 calculates 404, from the storage utilization data, average storage utilization data that includes an average of the storage utilization data from the customer location 101 for a billing period.

The method 400 calculates 406 billing information for the average storage utilization data for the billing period. The method 400 calculates 406 the billing information from the average storage utilization data and a calculated storage billing rate. The method 400 provides 408, to the customer, access to the billing information, and the method 400 ends. In various embodiments, all or a portion of the method 400 is implemented with the receiver module 202, the utilization module 204, the billing module 206, and/or the billing access module 208.

Figure 5:
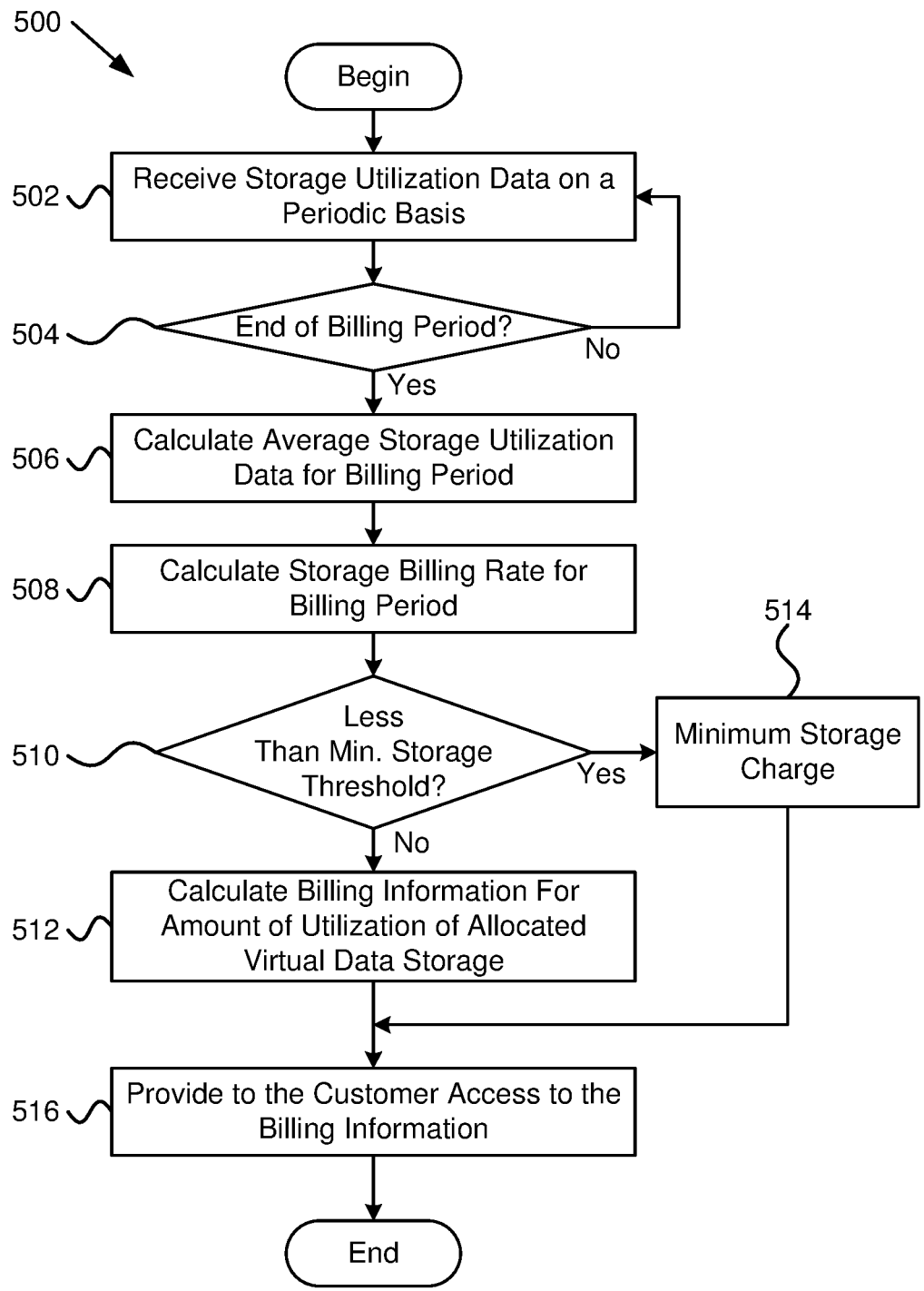
FIG. 5 is a schematic flow chart diagram illustrating another method for data storage metering and billing, according to various embodiments.

FIG. 5 is a schematic flow chart diagram illustrating another method 500 for data storage metering and billing, according to various embodiments. The method 500 begins and receives 502, at an owner server 123 on a periodic basis, storage utilization data. The storage utilization data includes one or more measurements of data storage usage for data storage 110 at a customer location 101 of a customer where the customer location 101 is remote from the owner server 123. The method 500 determines 504 if an end of a billing period has been reached. If the method 500 determines 504 that the end of the billing period has not been reached, the method 500 returns and continues to receive 502 storage utilization data.

If the method 500 determines 504 that the end of the billing period has been reached, the method 500 calculates 506, from the storage utilization data, average storage utilization data that includes an average of the storage utilization data from the customer location 101 for a billing period and calculates 508 a storage billing rate for the billing period. In various embodiments, the method 500 uses a class rate, a period modifier, a consumption level discount, a customer discount, and the like to calculate 508 the storage billing rate for the period. The method 500 determines 510 if the storage utilization for the billing period is less than a minimum storage threshold. If the method 500 determines 510 that the storage utilization for the billing period is less than the minimum storage threshold, the method 500 calculates 512 the billing information from the average storage utilization data and a calculated storage billing rate. If the method 500 determines 510 that the storage utilization for the billing period is not less than the minimum storage threshold, the method 500 uses 514 a minimum storage charge for the billing information. The method 500 provides 516, to the customer, access to the billing information, and the method 500 ends. In various embodiments, all or a portion of the method 500 is implemented with the receiver module 202, the utilization module 204, the billing module 206, the billing access module 208, the averaging module 302, the rate module 304, and/or the minimum charge module 306.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
receiving, at an owner server on a periodic basis, storage utilization data, the storage utilization data comprising one or more measurements of data storage usage for data storage at a customer location of a customer, the customer location remote from the owner server;
calculating, from the storage utilization data, average storage utilization data comprising an average of the storage utilization data from the customer location for a billing period;
calculating billing information for the average storage utilization data for the billing period, the billing information calculated from the average storage utilization data and a calculated storage billing rate; and
providing, to the customer, access to the billing information.

2. The method of claim 1, wherein the storage utilization data comprises a plurality of measurements of storage utilization data and wherein calculating the average storage utilization data for the billing period comprises averaging the plurality of measurements of storage utilization data.

3. The method of claim 1, wherein calculating the billing information for the average storage utilization data for the billing period comprises:
calculating the calculated storage billing rate from:
a class rate for a type of storage used at the customer location;
a period modifier based on an amount of time of a subscription for the data storage;
a consumption level discount comprising a discount level based on an amount of average storage utilization during the billing period; and/or
a customer discount for the subscription for the data storage comprising a pre-negotiated discount for the customer; and
multiplying the calculated storage billing rate by the average storage utilization data over the billing period.

4. The method of claim 3, wherein calculating the calculated storage billing rate comprises:

$$R = CPLD$$

where:
R is the calculated storage billing rate;
C is the class rate;
P is the period modifier;
L is the consumption level discount; and
D is the customer discount.

5. The method of claim 1, wherein calculating the billing information for the average storage utilization data for the billing period comprises:
comparing the average storage utilization data for the billing period with a minimum storage threshold;
calculating the billing information by multiplying the average storage utilization data by the calculated storage billing rate in response to the average storage utilization data for the billing period exceeding the minimum storage threshold; and
calculating the billing information by adding a minimum storage charge to the billing information for the billing period in response to the average storage utilization data for the billing period not exceeding the minimum storage threshold.

6. The method of claim 1, wherein the storage utilization data comprises virtual data storage usage of one or more virtual structures running on one or more servers at the customer location, the one or more virtual structures comprising virtual machines ("VMs") and/or containers.

7. The method of claim 1, wherein receiving the storage utilization data is over a management network separate from a data network used by one or more servers at the customer location.

8. The method of claim 7, wherein receiving the storage utilization data over the management network is via a virtual private network ("VPN").

9. The method of claim 1, wherein receiving the storage utilization data comprises receiving the storage utilization data over a secure communication protocol using full-duplex communication over a single web connection.

10. The method of claim 1, wherein receiving the storage utilization data is from a management server at the customer location and wherein the management server receives storage utilization data from one or more virtual structures on a plurality of servers at the customer location and stores the storage utilization data prior to transmission to the owner server, the one or more virtual structures comprising virtual machines ("VMs") and/or containers.

11. An apparatus comprising:
a processor; and
non-transitory computer readable storage media storing code, the code being executable by the processor to perform operations comprising:
receiving, at an owner server on a periodic basis, storage utilization data, the storage utilization data comprising one or more measurements of data storage usage for data storage at a customer location of a customer, the customer location remote from the owner server;
calculating, from the storage utilization data, average storage utilization data comprising an average of the storage utilization data from the customer location for a billing period;
calculating billing information for the average storage utilization data for the billing period, the billing information calculated from the average storage utilization data and a calculated storage billing rate; and
providing, to the customer, access to the billing information.

12. The apparatus of claim 11, wherein the storage utilization data comprises a plurality of measurements of storage utilization data and wherein calculating the average storage utilization data for the billing period comprises averaging the plurality of measurements of storage utilization data.

13. The apparatus of claim 11, wherein calculating the billing information for the average storage utilization data for the billing period comprises:
calculating the calculated storage billing rate from:
a class rate for a type of storage used at the customer location;
a period modifier based on an amount of time of a subscription for the data storage;
a consumption level discount comprising a discount level based on an amount of average storage utilization during the billing period; and/or
a customer discount for the subscription for the data storage comprising a pre-negotiated discount for the customer; and multiplying the calculated storage billing rate by the average storage utilization data over the billing period.

14. The apparatus of claim 13, wherein calculating the calculated storage billing rate comprises:

R=CPLD where:
R is the calculated storage billing rate;
C is the class rate;
P is the period modifier;
L is the consumption level discount; and
D is the customer discount.

15. The apparatus of claim 11, wherein calculating the billing information for the average storage utilization data for the billing period comprises:
comparing the average storage utilization data for the billing period with a minimum storage threshold;
calculating the billing information by multiplying the average storage utilization data by the calculated storage billing rate in response to the average storage utilization data for the billing period exceeding the minimum storage threshold; and
calculating the billing information by adding a minimum storage charge to the billing information for the billing period in response to the average storage utilization data for the billing period not exceeding the minimum storage threshold.

16. The apparatus of claim 11, wherein the storage utilization data comprises virtual data storage usage of one or more virtual structures running on one or more servers at the customer location, the one or more virtual structures comprising virtual machines ("VMs") and/or containers.

17. The apparatus of claim 11, wherein receiving the storage utilization data is over a management network separate from a data network used by one or more servers at the customer location.

18. The apparatus of claim 17, wherein receiving the storage utilization data over the management network is via a virtual private network ("VPN").

19. The apparatus of claim 11, wherein receiving the storage utilization data is from a customer server at the customer location and wherein the customer server receives storage utilization data from one or more virtual structures on a plurality of servers at the customer location and stores the storage utilization data prior to transmission to the owner server, the one or more virtual structures comprising virtual machines ("VMs") and/or containers.

20. A program product comprising a non-transitory computer readable storage medium storing code, the code being configured to be executable by a processor to perform operations comprising:
receiving, at an owner server on a periodic basis, storage utilization data, the storage utilization data comprising one or more measurements of data storage usage for data storage at a customer location of a customer, the customer location remote from the owner server;
calculating, from the storage utilization data, average storage utilization data comprising an average of the storage utilization data from the customer location for a billing period;
calculating billing information for the average storage utilization data for the billing period, the billing information calculated from the average storage utilization data and a calculated storage billing rate; and
providing, to the customer, access to the billing information.

* * * * *